US012632946B2

(12) United States Patent (10) Patent No.: US 12,632,946 B2
Kikuchi (45) Date of Patent: May 19, 2026

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Hiroaki Kikuchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 216 days.

(21) Appl. No.: 18/466,620

(22) Filed: Sep. 13, 2023

(65) Prior Publication Data

US 2023/0419468 A1 Dec. 28, 2023

Related U.S. Application Data

(63) Continuation of application No. PCT/JP2022/010616, filed on Mar. 10, 2022.

(30) Foreign Application Priority Data

Apr. 2, 2021 (JP) ................................. 2021-063672

(51) Int. Cl.
*G06T 7/00* (2017.01)
*G06T 7/60* (2017.01)
(Continued)

(52) U.S. Cl.
CPC .............. *G06T 7/0002* (2013.01); *G06T 7/60* (2013.01); *G06T 7/74* (2017.01); *G06T 17/20* (2013.01);
(Continued)

(58) Field of Classification Search
CPC ............ G06T 7/0002; G06T 7/60; G06T 7/74
See application file for complete search history.

(56) References Cited

U.S. PATENT DOCUMENTS

| 2018/0322623 A1* | 11/2018 | Memo .................... G06N 3/084 |
| 2019/0118945 A1* | 4/2019 | Loveland ............. G05D 1/0202 |
| 2019/0137409 A1* | 5/2019 | Nogami ................. G01N 21/84 |

FOREIGN PATENT DOCUMENTS

| JP | 2002-162260 A | 6/2002 |
| JP | 2011-124965 A | 6/2011 |

(Continued)

OTHER PUBLICATIONS

International Search Report issued in PCT/JP2022/010616; mailed May 31, 2022.
(Continued)

*Primary Examiner* — Matthew Salvucci
(74) *Attorney, Agent, or Firm* — Studebaker Brackett PLLC

(57) ABSTRACT

The image processing apparatus executes: processing of acquiring a plurality of images of a subject captured with overlapping imaging ranges from a plurality of viewpoints; processing of detecting damage to a surface of the subject from the acquired plurality of images; processing of generating three-dimensional point group data of feature points; processing of generating a three-dimensional patch model of the subject on the basis of the generated point group data; processing of selecting an image corresponding to each patch of the three-dimensional patch model from the acquired plurality of images; processing of measuring a size of the damage in a region corresponding to the patch in the selected image; processing of generating correction information necessary for correcting a measurement result of the size of the damage; and processing of correcting the measurement result of the size of the damage on the basis of the generated correction information.

15 Claims, 16 Drawing Sheets

(51) Int. Cl.
G06T 7/73 (2017.01)
G06T 17/20 (2006.01)

(52) U.S. Cl.
CPC ............... *G06T 2207/30184* (2013.01); *G06T 2207/30244* (2013.01); *G06T 2210/56* (2013.01)

(56) References Cited

FOREIGN PATENT DOCUMENTS

| | | | |
|---|---|---|---|
| JP | 2015-114954 | A | 6/2015 |
| JP | 2020-038227 | A | 3/2020 |
| JP | 2020-160944 | A | 10/2020 |

OTHER PUBLICATIONS

International Preliminary Report on Patentability (Chapter I) and Written Opinion of the International Searching Authority issued in PCT/JP2022/010616; issued Oct. 3, 2023.
"Notice of Reasons for Refusal" Office Action issued in JP 2023-510797; mailed by the Japanese Patent Office on Oct. 2, 2025.
An Office Action, "Notice of Reasons for Refusal," mailed by the Japanese Patent Office on Mar. 2, 2026, which corresponds to Japanese Patent Application No. 2023-510797 and is related to U.S. Appl. No. 18/466,620; with English language translation.
Kazuo Oda, "Explanation: Structure from Motion (SfM) First SfM Overview and Bundle Adjustment," Photogrammetry and Remote Sensing, 2016, vol. 55, No. 3, pp. 206-209.

\* cited by examiner

START

ACQUIRE IMAGE GROUP — S1

DETECT FEATURE POINTS — S2

DETECT CORRESPONDING POINTS — S3

ESTIMATE CAMERA PARAMETERS — S4

ESTIMATE POSITION AND POSTURE OF CAMERA — S5

PERFORM THREE-DIMENSIONAL RESTORATION OF FEATURE POINTS — S6

END $$\cos \theta = \frac{a \cdot b}{|a| \, |b|}$$

IMAGE PROCESSING APPARATUS, IMAGE PROCESSING METHOD, AND IMAGE PROCESSING PROGRAM

CROSS-REFERENCE TO RELATED APPLICATIONS

The present application is a Continuation of PCT International Application No. PCT/JP2022/010616 filed on Mar. 10, 2022 claiming priority under 35 U.S.C. § 119(a) to Japanese Patent Application No. 2021-063672 filed on Apr. 2, 2021. Each of the above applications is hereby expressly incorporated by reference, in its entirety, into the present application.

BACKGROUND OF THE INVENTION

1. Field of the Invention

The present invention relates to an image processing apparatus, an image processing method, and an image processing program. In particular, the present invention relates to an image processing apparatus that processes an image obtained by imaging a structure, detects a damage on a surface of the structure, and measures a size thereof, an image processing method therefor, and an image processing program therefor.

2. Description of the Related Art

Social infrastructure structures such as bridges, dams, and tunnels are required to undergo periodic inspections once every few years. For example, bridges are required to be periodically inspected once every five years. As a technique of supporting this operation, there is a known technique of automatically extracting damages (fissurings, free lime, and the like) appearing on the surface of the structure from an image obtained by imaging the structure.

JP2002-162260A describes a technique of detecting deterioration in appearance such as cracks from an image which is obtained by imaging a structure (standing concrete pole) and measuring a size (length and width) thereof, and describes a technique of correcting a measurement result in accordance with a position of the deterioration in appearance in order to obtain a more accurate size thereof.

SUMMARY OF THE INVENTION

However, the techniques described in JP2002-162260A have disadvantages in that it is necessary to measure in detail the position, an angle, and the like of the deterioration in appearance in order to obtain information for correcting the measurement result and a large amount of labor is necessary for the measurement.

The present invention has been made in view of such situations, and an object of the present invention is to provide an image processing apparatus, an image processing method, and an image processing program capable of easily measuring an accurate size of a damage.

(1) An image processing apparatus comprising a processor, in which the processor is configured to execute: processing of acquiring a plurality of images of a subject captured by a camera with overlapping imaging ranges from a plurality of viewpoints; processing of detecting damage to a surface of the subject from the acquired plurality of images; processing of generating three-dimensional point group data of feature points by analyzing the acquired plurality of images; processing of generating a three-dimensional patch model of the subject on the basis of the generated point group data; processing of selecting an image corresponding to each patch of the three-dimensional patch model from the acquired plurality of images; processing of measuring a size of the damage in a region corresponding to the patch in the selected image; processing of generating correction information necessary for correcting a measurement result of the size of the damage on the basis of a camera vector a connecting a position of the camera to the patch in a case of capturing the selected image and a normal vector b of the patch; and processing of correcting the measurement result of the size of the damage on the basis of the generated correction information.

(2) The image processing apparatus according to (1), in which the processor generates the correction information by calculating a cosine value $\cos \theta$ of an angle $\theta$ formed between the camera vector a and the normal vector b, in the processing of generating the correction information.

(3) The image processing apparatus according to (2), in which the processor calculates the cosine value $\cos \theta$ on the basis of $\cos \theta = a \cdot b / |a||b|$.

(4) The image processing apparatus according to (2) or (3), in which the processor corrects the measurement result of the size of the damage by dividing the measurement result of the size of the damage by the cosine value $\cos \theta$, in the processing of correcting the measurement result of the size of the damage.

(5) The image processing apparatus according to any one of (1) to (4), in which the processor selects an image having a smallest angle $\theta$ formed between the camera vector a and the normal vector b, in the processing of selecting the image corresponding to the patch.

(6) The image processing apparatus according to any one of (1) to (4), in which the processor selects an image having a highest imaging resolution in the processing of selecting the image corresponding to the patch.

(7) The image processing apparatus according to any one of (1) to (4), in which the processor selects an image in which a position of the region corresponding to the patch is closest to a center of the image, in the processing of selecting the image corresponding to the patch.

(8) The image processing apparatus according to any one of (1) to (7), in which the processor generates the patch using a triangular mesh or a square mesh, and generates the three-dimensional patch model, in the processing of generating the three-dimensional patch model.

(9) The image processing apparatus according to any one of (1) to (8), in which the processor further executes processing of calculating a physical dimension of the patch in the three-dimensional patch model.

(10) The image processing apparatus according to (9), in which the processor calculates the physical dimension of the patch, on the basis of distance measurement information associated with the image, in the processing of calculating the physical dimension of the patch.

(11) The image processing apparatus according to (9), in which the processor calculates the physical dimension of the patch, on the basis of information about a reference point included in the image, in the processing of calculating the physical dimension of the patch.

(12) The image processing apparatus according to any one of (1) to (11), in which the damage is fissuring, and the processor measures either of a width or a length of the fissuring, in the processing of measuring the size of the damage.

(13) The image processing apparatus according to (12), in which the processor further executes processing of extracting the patch in which the fissuring is continuous, adding up the length of the fissuring which is subjected to the correction and which is obtained in each of the extracted patches, and measuring the length of the continuous fissuring.

(14) An image processing method including: a step of acquiring a plurality of images of a subject captured by a camera with overlapping imaging ranges from a plurality of viewpoints; a step of detecting damage to a surface of the subject from the acquired plurality of images; a step of generating three-dimensional point group data of feature points by analyzing the acquired plurality of images; a step of generating a three-dimensional patch model of the subject on the basis of the generated point group data; a step of selecting an image corresponding to each patch of the three-dimensional patch model from the acquired plurality of images; a step of measuring a size of the damage in a region corresponding to the patch in the selected image; a step of generating correction information necessary for correcting a measurement result of the size of the damage on the basis of a camera vector a connecting a position of the camera to the patch in a case of capturing the selected image and a normal vector b of the patch; and a step of correcting the measurement result of the size of the damage on the basis of the generated correction information.

(15) An image processing program implemented on a computer, the image processing program causing the computer to execute: a function of acquiring a plurality of images of a subject captured by a camera with overlapping imaging ranges from a plurality of viewpoints; a function of detecting damage to a surface of the subject from the acquired plurality of images; a function of generating three-dimensional point group data of feature points by analyzing the acquired plurality of images; a function of generating a three-dimensional patch model of the subject on the basis of the generated point group data; a function of selecting an image corresponding to each patch of the three-dimensional patch model from the acquired plurality of images; a function of measuring a size of the damage in a region corresponding to the patch in the selected image; a function of generating correction information necessary for correcting a measurement result of the size of the damage on the basis of a camera vector a connecting a position of the camera to the patch in a case of capturing the selected image and a normal vector b of the patch; and a function of correcting the measurement result of the size of the damage on the basis of the generated correction information.

According to the present invention, an accurate size of the damage can be easily measured.

DESCRIPTION OF THE PREFERRED EMBODIMENTS

Hereinafter, preferred embodiments of the present invention will be described in detail with reference to the accompanying drawings.

First Embodiment

Here, a case of measuring a width of a fissuring generated on a surface of a bridge pier will be described as an example. The bridge pier is an example of a structure made of concrete, particularly reinforced concrete. The fissuring is an example of a damage. A width of the fissuring is an example of a size of the damage.

[System Configuration]

Figure 1:
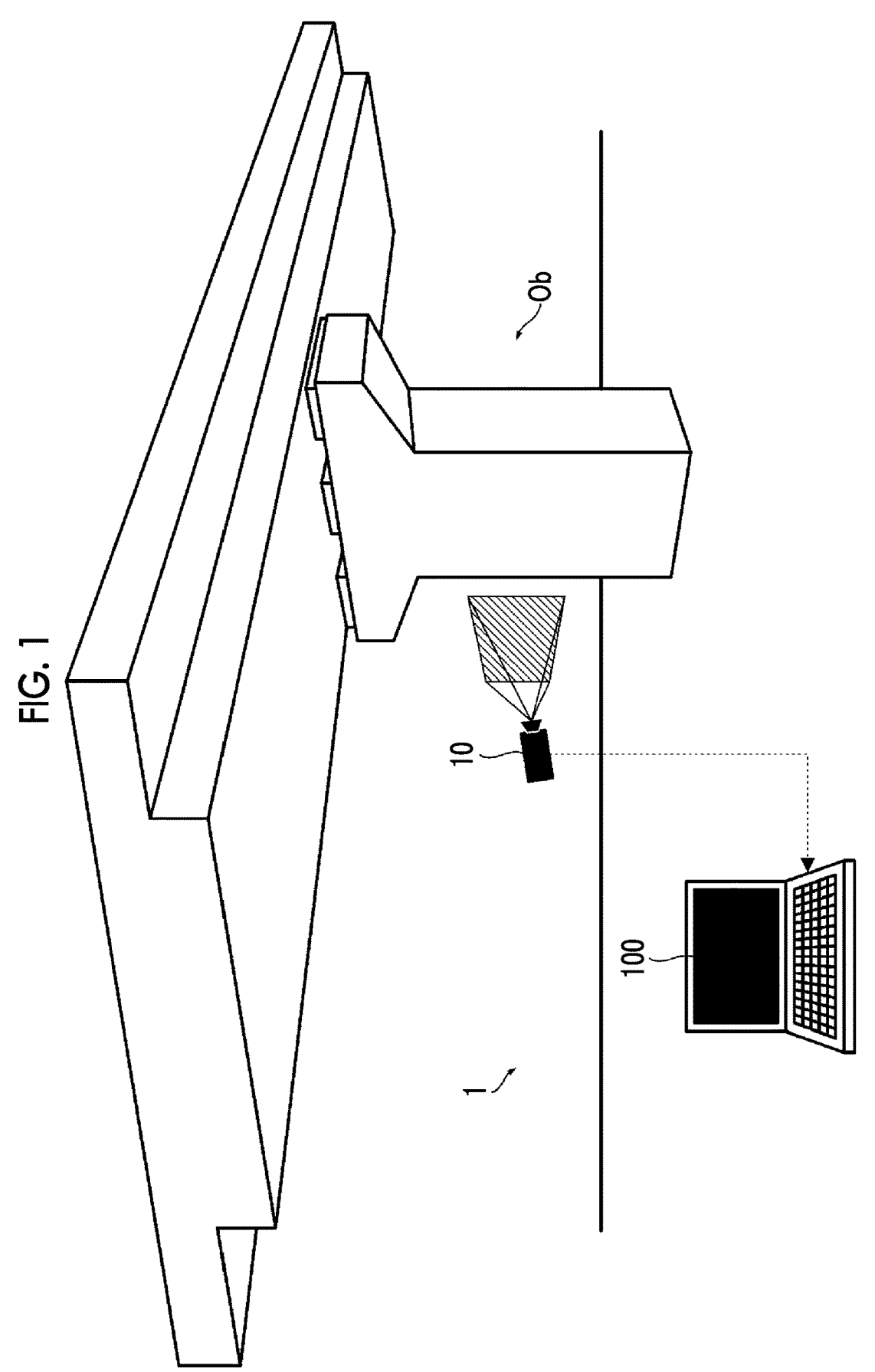
FIG. 1 is a diagram showing a schematic configuration of a system that measures a width of a fissuring.

FIG. 1 is a diagram showing a schematic configuration of a system that measures the width of the fissuring.

As shown in the drawing, a system 1 of the present embodiment includes a camera 10 and an image processing apparatus 100 that processes an image captured by camera 10.

The camera 10 is for imaging a measurement target. As the camera 10, a general digital camera (including a camera mounted on a mobile terminal or the like) is used. As described above, in the present embodiment, the fissurings generated on the surface of a bridge pier Ob are the measurement targets. In such a case, imaging is performed with the bridge pier Ob set as a subject.

Figure 2:
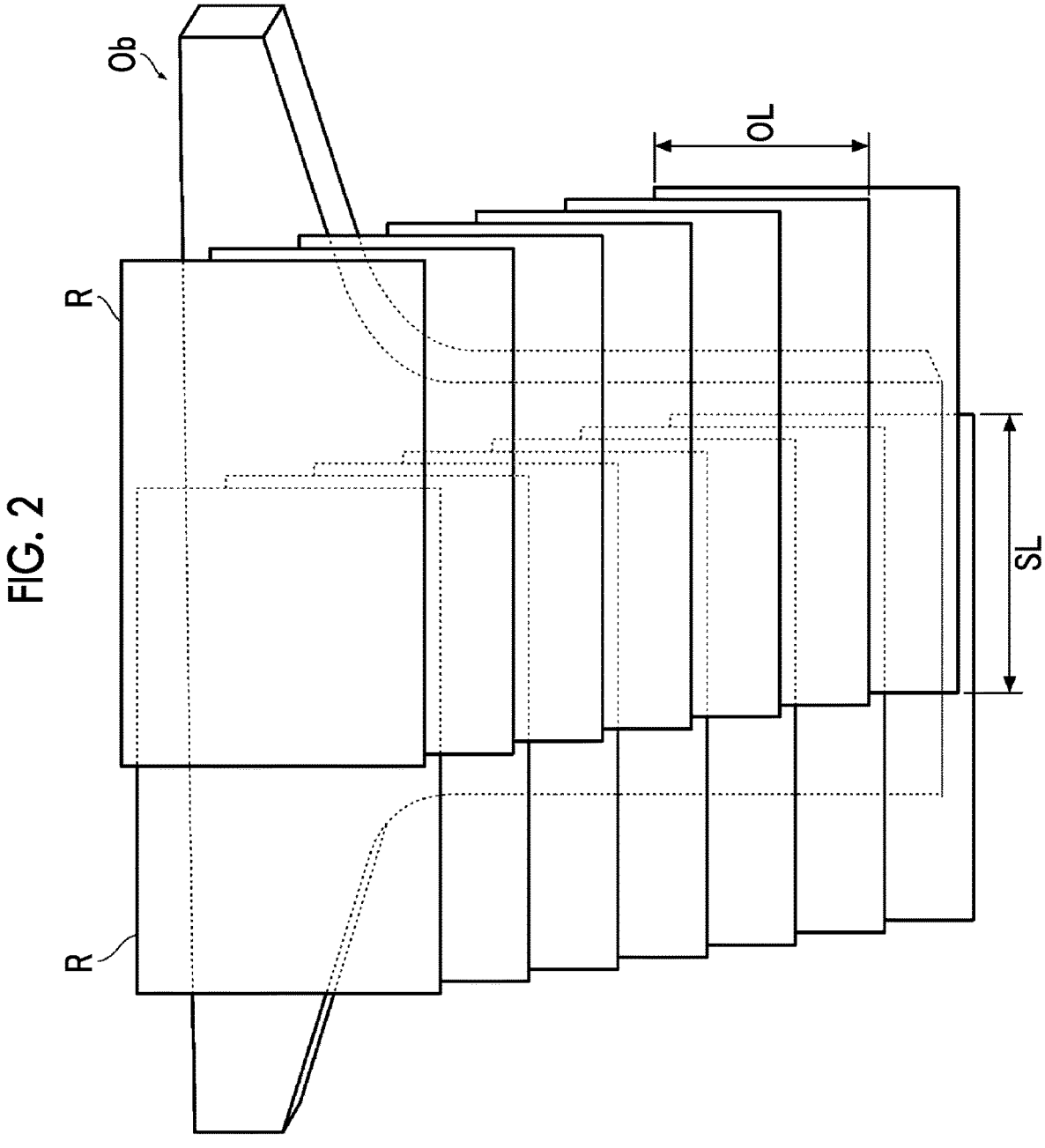
FIG. 2 is a conceptual diagram of imaging.

FIG. 2 is a conceptual diagram of the imaging.

In the drawing, a rectangular region represented by a reference numeral R indicates an imaging range for one shot. As shown in FIG. 2, the imaging is performed from a plurality of viewpoints with the imaging ranges R overlapping. For example, the imaging is performed with an overlap OL of 80% or more and a side lap SL of 60% or more. The overlap OL means overlapping in a course direction in a case of imaging along a course on a straight line. Consequently, "the overlap OL is 80% or more" means that the overlap rate of the images in the course direction is 80% or more. Further, the side lap SL means overlapping between the courses. Consequently, "the side lap SL is 60% or more" means that the overlap rate of the images between the courses is 60% or more.

The image processing apparatus 100 processes an image captured by the camera 10, detects a fissuring generated on a surface of the structure, and measures the width thereof. The image processing apparatus 100 is composed of a computer including an input device, a display device, and the like.

Figure 3:
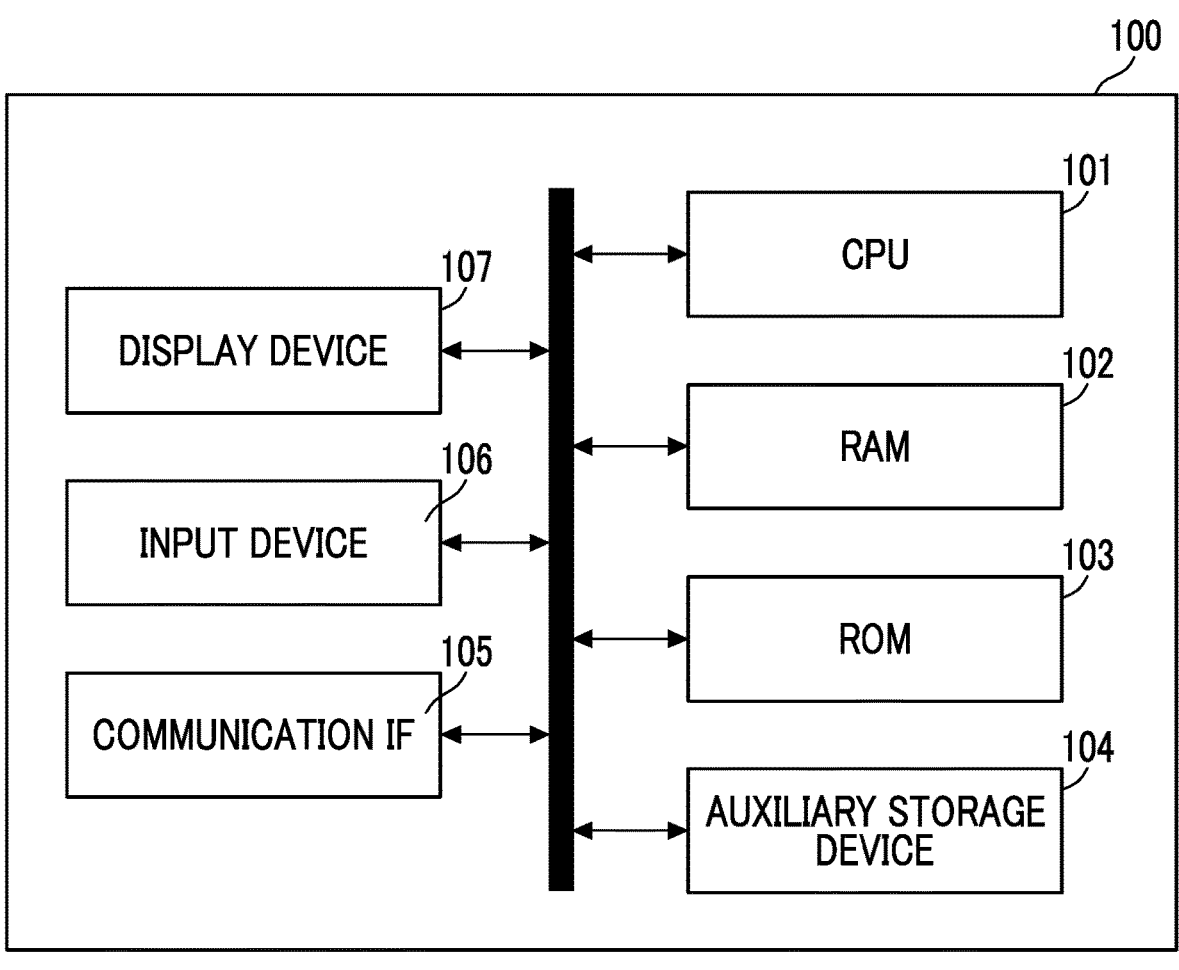
FIG. 3 is a block diagram showing an example of a hardware configuration of an image processing apparatus.

FIG. 3 is a block diagram showing an example of a hardware configuration of the image processing apparatus.

As shown in the drawing, the image processing apparatus 100 includes a central processing unit (CPU) 101, a random-access memory (RAM) 102, a read-only memory (ROM) 103, an auxiliary storage device 104, a communication interface (IF) 105, an input device 106, a display device 107, and the like. The ROM 103 and/or the auxiliary storage device 104 stores a program, which is executed by the CPU 101, and various types of data. The auxiliary storage device 104 is composed of, for example, a hard disk drive (HDD), a solid-state drive (SSD), or the like. The input device 106 is composed of, for example, a keyboard, a mouse, a touch panel, or the like. The display device 107 is composed of, for example, a liquid-crystal display, an organic light-emitting diode display, or the like. The image captured by the camera 10 is taken in the image processing apparatus 100 through the communication interface 105 and stored in the auxiliary storage device 104.

Figure 4:
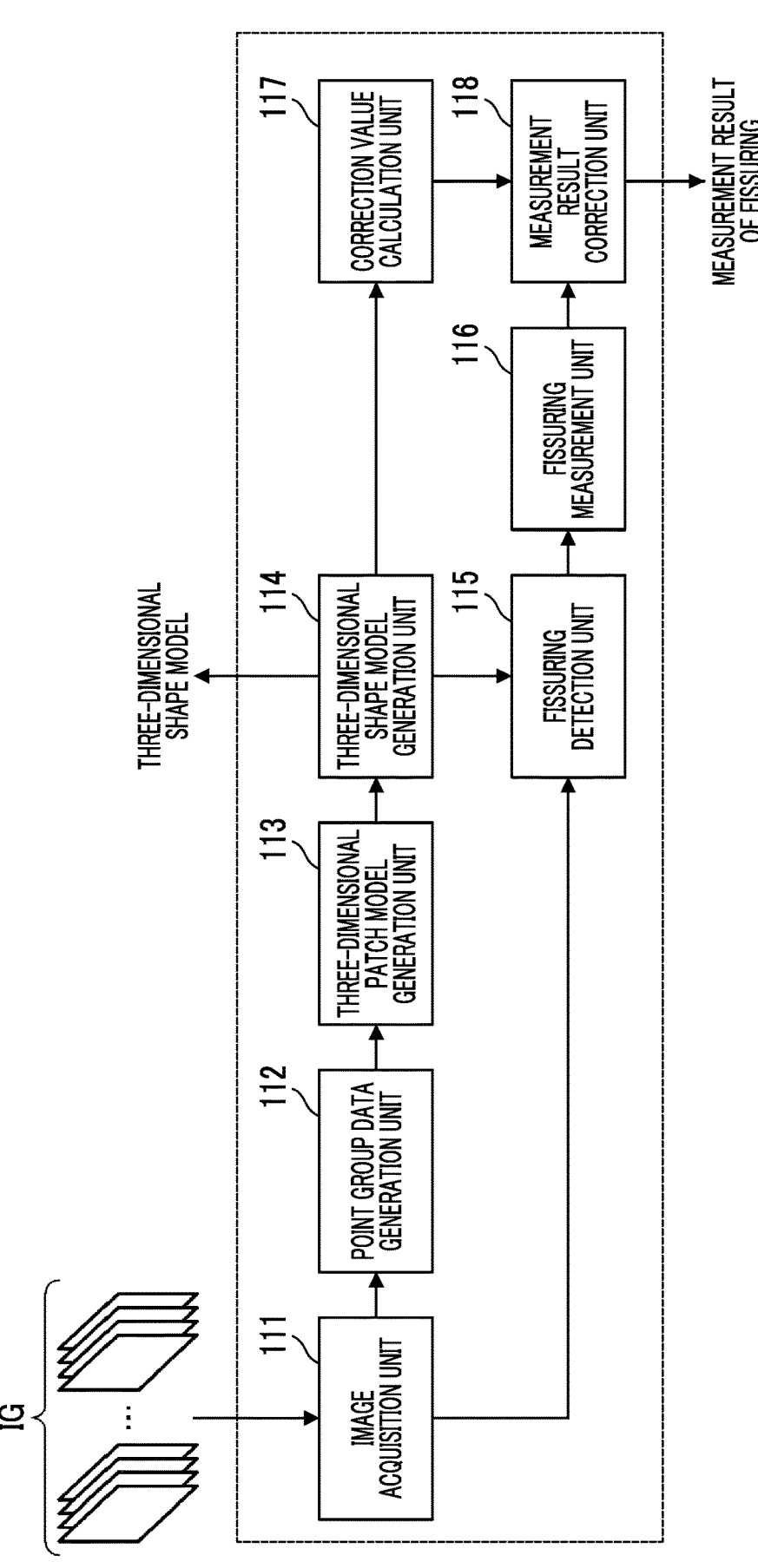
FIG. 4 is a block diagram of main functions of the image processing apparatus.

FIG. 4 is a block diagram of main functions of the image processing apparatus.

As shown in the drawing, the image processing apparatus 100 mainly has functions of an image acquisition unit 111, a point group data generation unit 112, a three-dimensional patch model generation unit 113, a three-dimensional shape model generation unit 114, a fissuring detection unit 115, a fissuring measurement unit 116, a correction value calculation unit 117, a measurement result correction unit 118, and the like. The functions are implemented by the processor executing a predetermined program (image processing program).

The image acquisition unit 111 performs processing of acquiring an image group IG as a processing target. The image group IG as the processing target is composed of a plurality of images in which the bridge pier is captured by the camera 10 from a plurality of viewpoints with the imaging ranges R overlapping. The image acquisition unit 111 acquires the image group IG as the processing target from the auxiliary storage device 104.

The point group data generation unit 112 analyzes the image group IG acquired by the image acquisition unit 111 and performs processing of generating three-dimensional point group data of feature points. In the present embodiment, the processing is performed by using techniques of structure from motion (SfM) and multi-view stereo (MVS).

Figure 5:
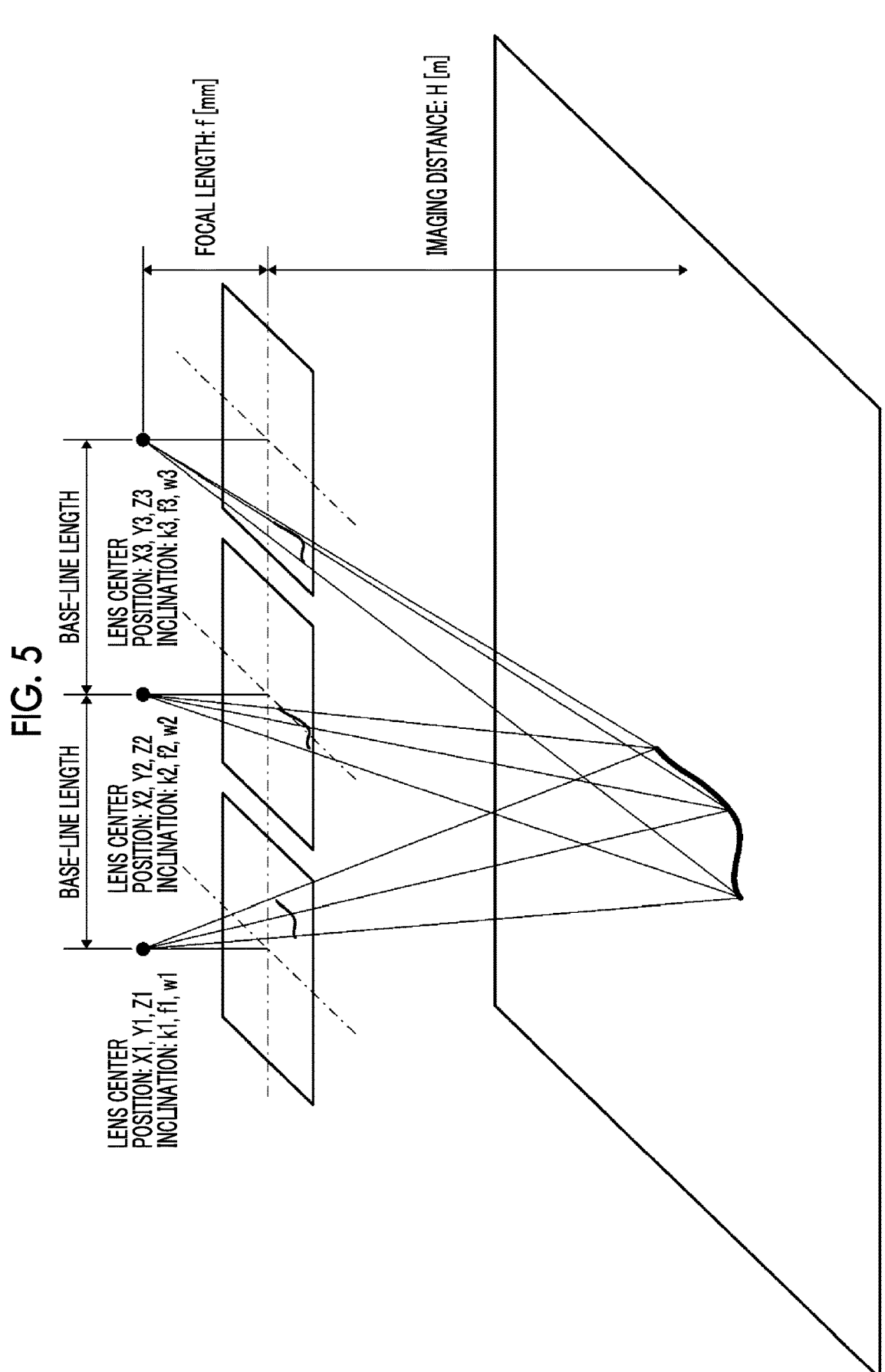
FIG. 5 is a diagram showing a brief overview of SfM.

FIG. 5 is a diagram showing a brief overview of the SfM.

The SfM is a technique of performing "estimation of captured position and posture" and "three-dimensional restoration of feature points" from a plurality of images captured by the camera. The SfM technique itself is a known technique. The brief overview of the processing is as follows.

Figure 6:
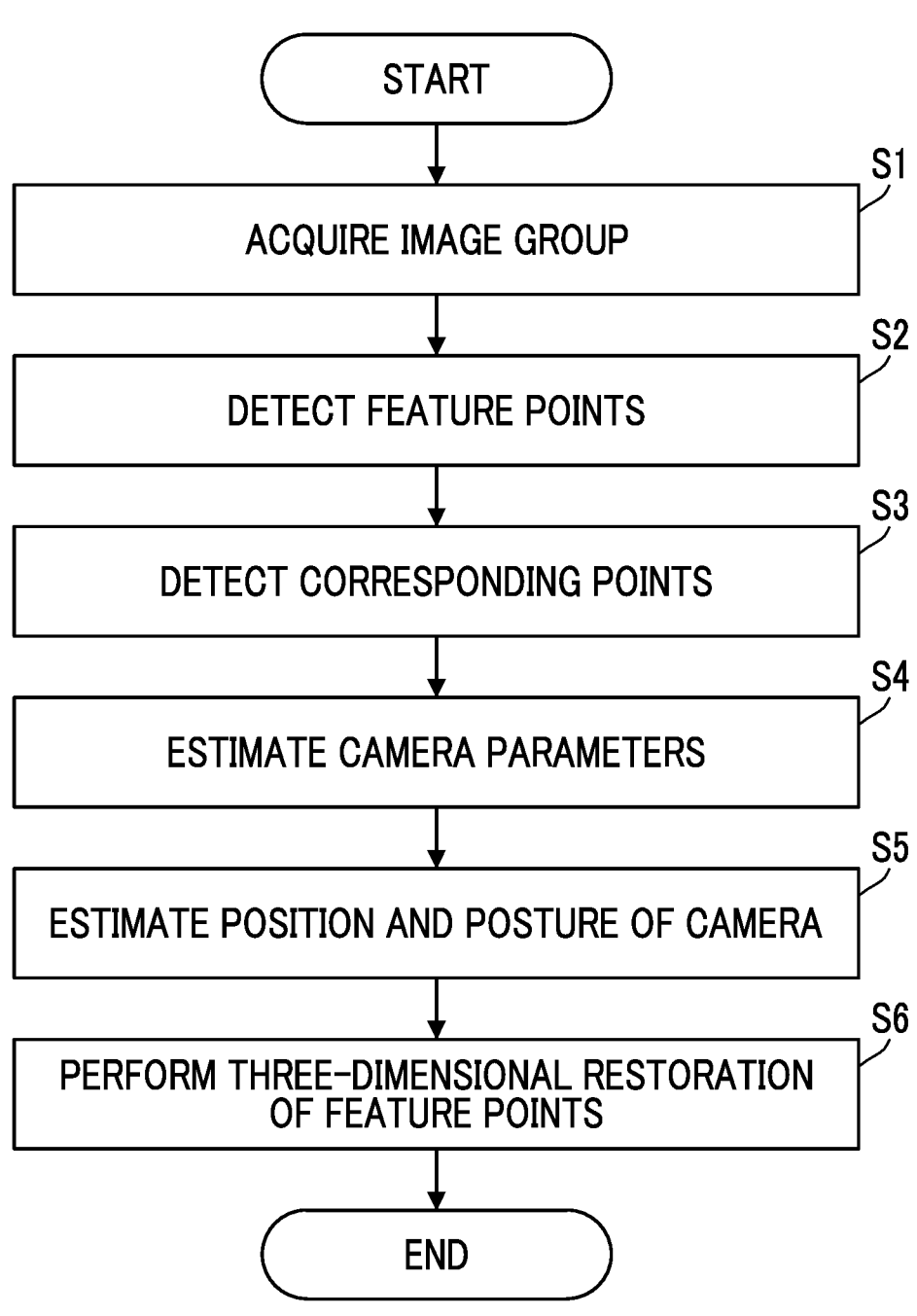
FIG. 6 is a flowchart showing a brief overview of a procedure of processing of the SfM.

FIG. 6 is a flowchart showing a brief overview of a procedure for processing of the SfM.

First, the plurality of images (image groups) as the processing target are acquired (step S1). Next, the feature points are detected from each of the acquired images (step S2). Next, by comparing the feature points between a pair of two images, matching feature points are detected as corresponding points (step S3). That is, matching between the feature points is performed. Next, camera parameters (for example, a basic matrix, a fundamental matrix, internal parameters, and the like) of the camera that has captured the pair of two images are estimated from the detected corresponding points (step S4). Next, the imaging position and the posture are estimated on the basis of the estimated camera parameters (step S5). Further, three-dimensional positions of the feature points of the object are obtained (step S6). That is, three-dimensional restoration of the feature points is performed. Thereafter, bundle adjustment is performed as necessary. That is, camera internal parameters (a focal length and a principal point), camera external parameters (a position and rotation) and coordinates of the three-dimensional point group are adjusted such that an error in reprojection of the point group (point cloud), which is a set of the feature points in the three-dimensional coordinates, on the camera is minimized.

The three-dimensional points restored by the SfM are specific three-dimensional points and are non-dense. In a general three-dimensional model, a texture having a low feature amount occupies a large part (for example, a wall). It is the MVS that attempts to restore a three-dimensional texture having a low feature amount that occupies the large part. The MVS uses the "imaging position and posture" estimated by the SfM to generate a dense point group. The technique of the MVS itself is a known technique. Accordingly, a detailed description thereof will not be given.

Further, the restored shape and the imaging position obtained by the SfM are a point group represented by non-dimensional coordinate values. Consequently, it is difficult to quantitatively understand the shape with the obtained restored shape. Therefore, it is necessary to apply physical dimensions (actual dimensions). A known technique is adopted for this processing. For example, a technique of extracting a reference point (for example, a ground control point) from an image and applying physical dimensions can be adopted. The ground control point (GCP) is a marker that includes geospatial information (a latitude, a longitude, and an altitude) that can be visually recognized in the captured image. Consequently, in such a case, it is necessary to set the reference point at a step of imaging. Further, in a case where distance measurement information is associated with the captured image, the distance measurement information can be used to apply the physical dimensions. For example, in a case of imaging a subject by using an unmanned aerial vehicle (UAV) such as a drone, both the camera and light detection and ranging or laser imaging, detection, and ranging (LIDAR) may be mounted on the unmanned aerial vehicle, and the image may be captured. In such a case, both the image and the distance measurement information obtained by the LIDAR can be acquired. By using the distance measurement information, it is possible to apply information about physical dimensions to the three-dimensional point group data obtained by the SfM. In addition, it is also possible to extract an object having known physical dimensions from the image and apply the physical dimensions.

The three-dimensional patch model generation unit 113 performs processing of generating a three-dimensional patch model of the subject on the basis of the three-dimensional point group data of the subject which is generated by the point group data generation unit 112. Specifically, a patch (mesh) is generated from the generated three-dimensional point group, and the three-dimensional patch model is generated. Thereby, it is possible to express undulations of a surface with a small number of points. The processing is performed using, for example, a known technique such as three-dimensional Delaunay triangulation. Consequently, details of the description thereof will not be given. For example, in the present embodiment, a triangular irregular network (TIN) model is generated using the three-dimensional Delaunay triangulation. The TIN model is an example of the three-dimensional patch model.

Figure 7:
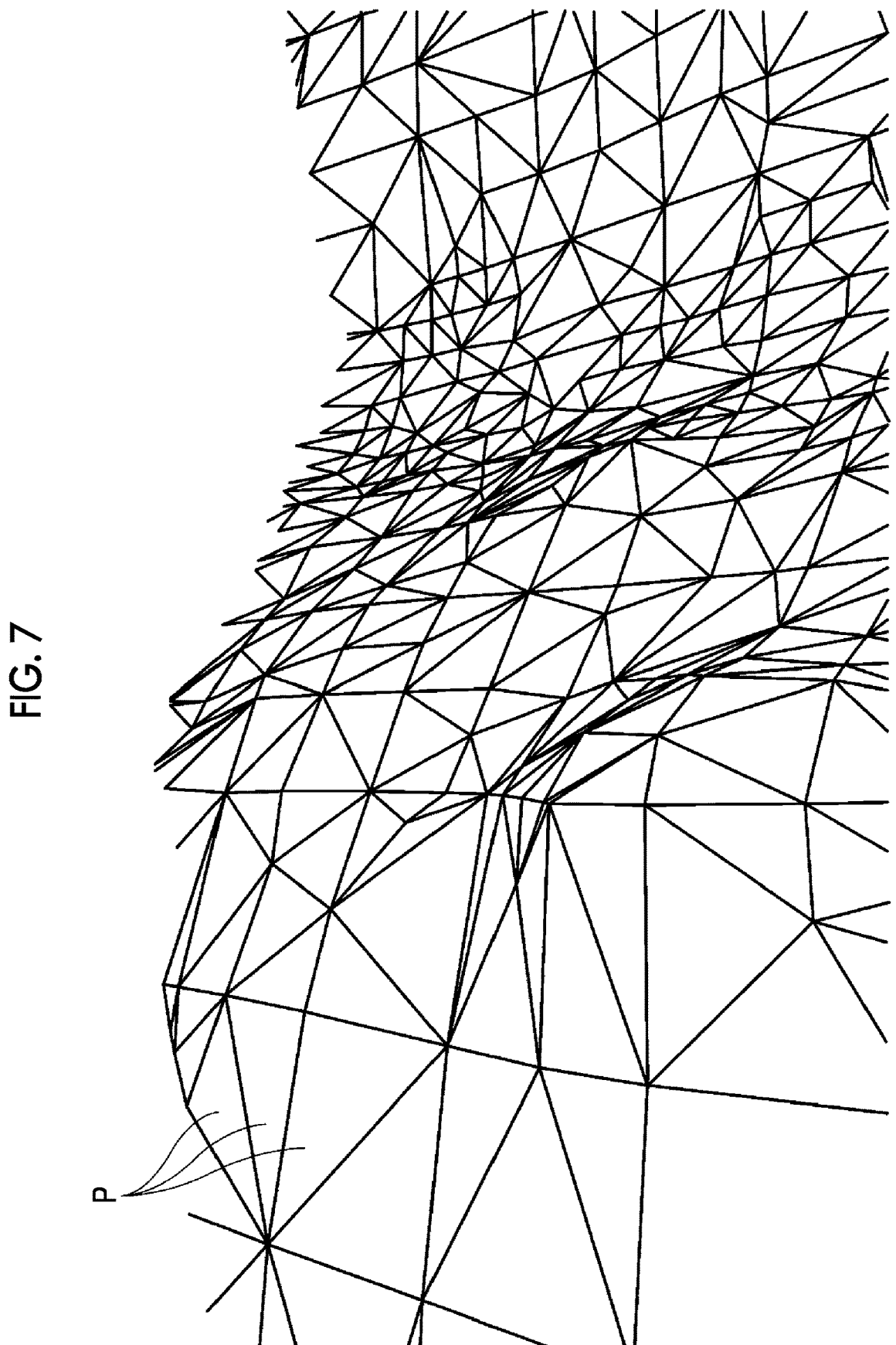
FIG. 7 is a diagram showing an example of a TIN model.

FIG. 7 is a diagram showing an example of the TIN model.

As shown in the drawing, in the TIN model, the surface is represented by a set of triangles. That is, a patch P is generated on the basis of the triangular mesh.

The three-dimensional shape model generation unit 114 performs processing of generating a three-dimensional shape model to which a texture is applied by performing texture mapping on the three-dimensional patch model which is generated by the three-dimensional patch model generation unit 113. The processing is performed by interpolating space in each patch of the three-dimensional patch model with the captured image. As described above, in the image processing apparatus 100 of the present embodiment, the point group data generation unit 112 performs the processing of the SfM and the MVS. Through the processing of the SfM and the MVS, an image which is obtained by imaging regions corresponding to the respective patches and corresponding positions in the image can be acquired. Consequently, in a case where vertices of a generated surface can be observed, it is possible to associate a texture to be applied to the surface. The three-dimensional shape model generation unit 114 selects an image corresponding to each patch, and extracts an image of a region, which corresponds to the patch from the selected image, as a texture. Specifically, the vertices of the patches are projected onto the selected image, and the image of the region, which is surrounded by the projected vertices, is extracted as a texture. The extracted texture is applied to the patch to generate the three-dimensional shape model. Consequently, by interpolating the space in the patch with the extracted texture, the three-dimensional shape model is generated.

Figure 8:
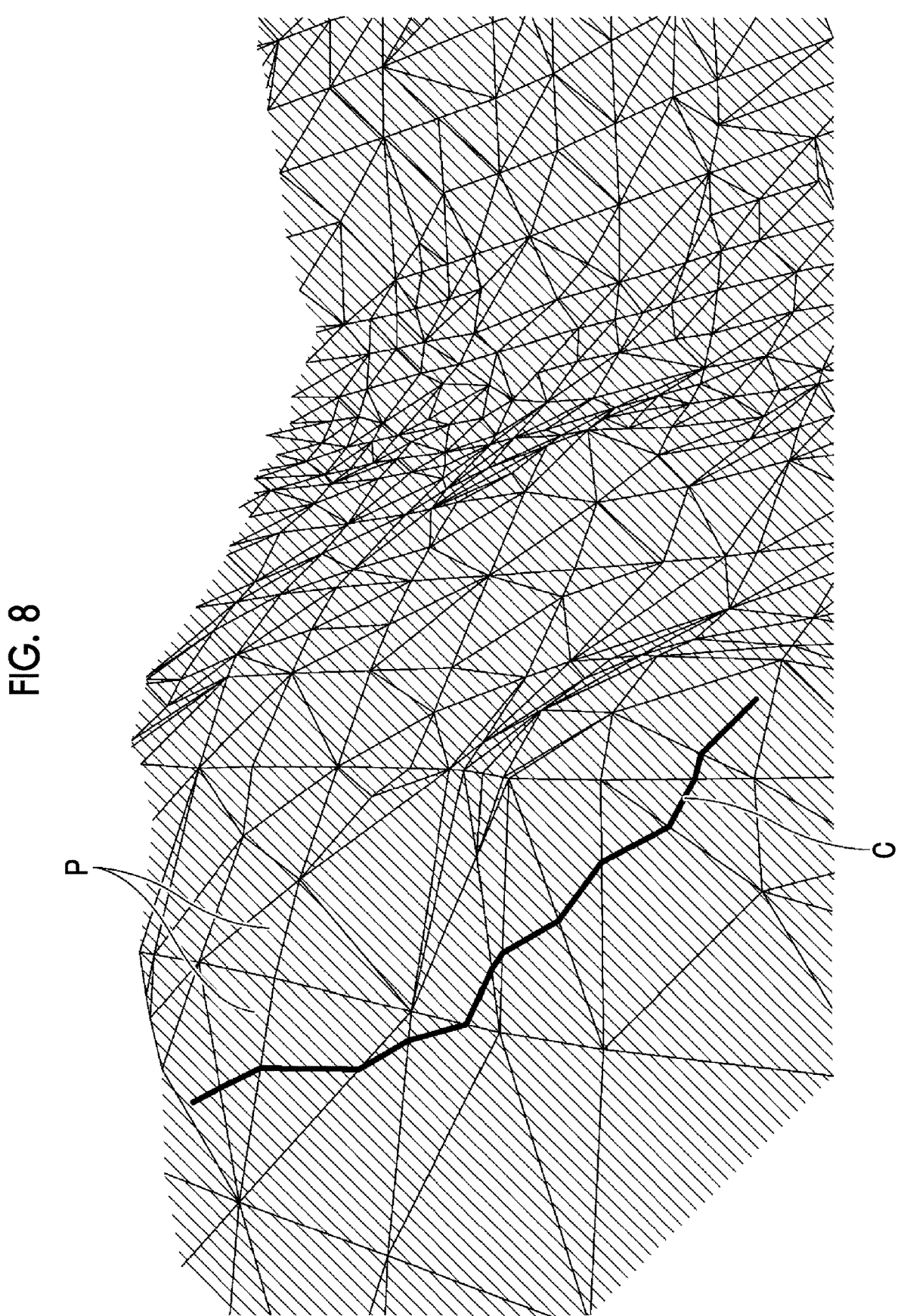
FIG. 8 is a diagram showing an example of a three-dimensional shape model.

FIG. 8 is a diagram showing an example of the three-dimensional shape model.

As shown in the drawing, color information is added to each patch by applying the texture to each patch. In a case where a fissuring is present in the subject, a fissuring C is displayed at the corresponding position.

The generated three-dimensional shape model is stored in the auxiliary storage device 104 or the like as necessary. Further, the generated three-dimensional shape model is displayed on the display device 107 as necessary.

The fissuring detection unit 115 performs processing of detecting a fissuring from each acquired image. As a technique of detecting a fissuring from an image, a known technique can be adopted. For example, it is possible to adopt a technique of detecting a fissuring from an image by using an image recognition model which is generated by machine learning, deep learning, or the like. The type of machine learning algorithm is not particularly limited. For example, it is possible to use an algorithm using a neural network such as a recurrent neural network (RNN), a convolutional neural network (CNN), or a multilayer perceptron (MLP). In a case where fissuring is detected using the image recognition model, the image is preprocessed as necessary. Consequently, processing (for example, filtering) for improving recognition accuracy is performed.

The fissuring measurement unit 116 performs processing of measuring a width of the fissuring detected by the fissuring detection unit 115. A well-known image measurement technique is adopted for the measurement. In a case where the texture applied to each patch includes the fissuring, the width of the fissuring is measured through the processing.

The correction value calculation unit 117 performs processing of calculating a correction value. This correction value is for correcting the measured value of the width of the fissuring in the patch including the fissuring.

Here, the necessity of correcting the measured value of the width of the fissuring will be described.

Figure 9:
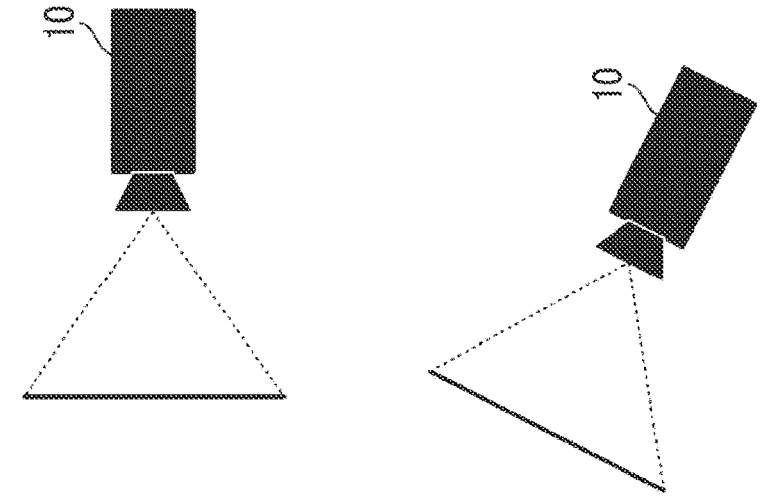
FIG. 9 is a conceptual diagram of correction of a width of the fissuring.
Figure 9:
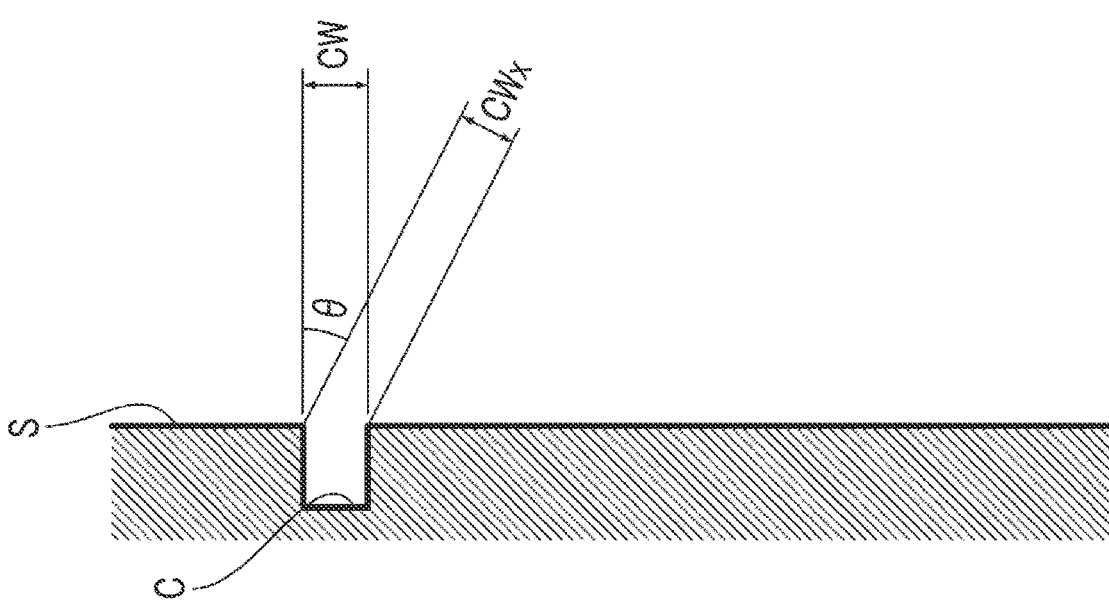

FIG. 9 is a conceptual diagram of the correction of the width of the fissuring.

As shown in the drawing, in a case where the camera 10 faces a surface S including a fissuring C and captures an image, a width of the fissuring measured from the image coincides with an actual width CW of the fissuring.

On the other hand, in a case where the camera 10 is inclined with respect to the surface S including the fissuring C and captures the image, that is, in a case where an image is captured in a tilted state, a width CWx of the fissuring measured from the image is less than the actual width CW of the fissuring, due to the tilt (CWx<CW).

Consequently, it is necessary to correct the measured value of the width of the fissuring of which the width is measured from the image captured in the tilted state.

Assuming that an angle of tilt is $\theta$, a relationship of the following expression is established between the actual width CW of the fissuring and the width CWx of the fissuring measured from the image captured in the tilted state.

$$CW = CWx/\cos \theta$$

Consequently, the correction value calculation unit 117 calculates $\cos \theta$ as a correction value $\sigma$. The correction value $\sigma$ is an example of the correction information.

As described above, in the image processing apparatus 100 of the present embodiment, the point group data is generated by using the SfM, in the point group data generation unit 112. In the SfM, a position at which an image is captured (a position of the camera) and a posture can be estimated. Consequently, the correction value can be calculated by using this information.

Figure 10:
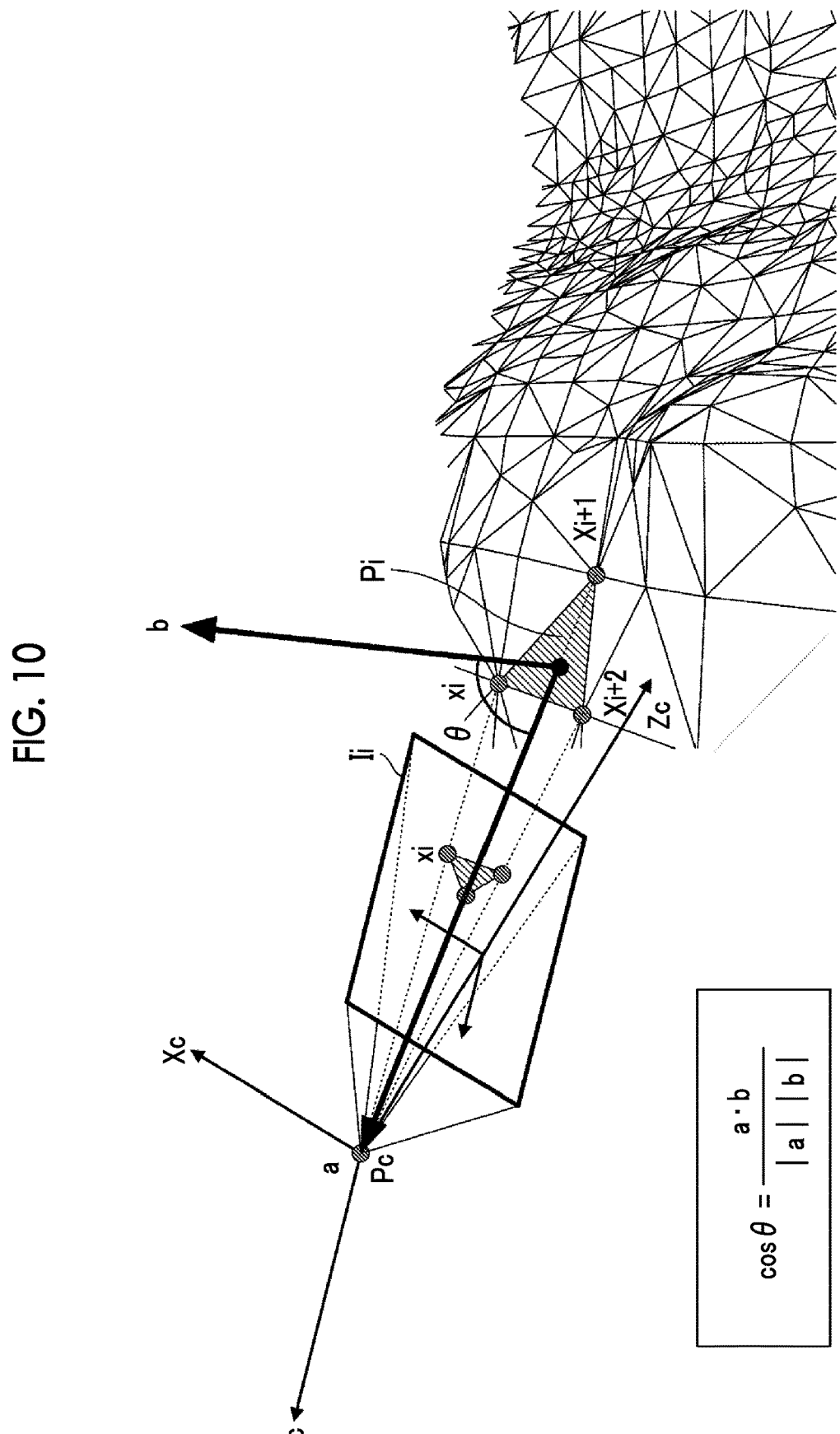
FIG. 10 is a conceptual diagram of calculation of a correction value.

FIG. 10 is a conceptual diagram of calculation of the correction value.

The drawing shows an example in which the correction value $\sigma$ in a patch Pi indicated by hatching is calculated.

An image obtained by extracting a texture to be applied to the patch Pi as a calculation target is set as an image Ii. The image Ii is an image corresponding to the patch Pi. A position (imaging position) of the camera in a case where the image Ii is captured is set as a position Pc. The position Pc of the camera can be estimated by the SfM.

A vector connecting the position Pc of the camera and a centroid or a center of the patch Pi is set as a camera vector, and the camera vector is referred to as a. Further, a normal vector of the patch Pi is referred to as b.

The angle of tilt $\theta$ in a case where the image Ii is captured is obtained by an angle formed between the camera vector a and the normal vector b. Then, the cosine value $\cos \theta$ at the angle $\theta$ can be calculated by $\cos \theta = a \cdot b / |a||b|$. Therefore, the correction value $\sigma$ can be calculated by $\sigma = a \cdot b / |a||b|$.

The correction value calculation unit 117 calculates the correction value $\sigma$ for each patch. It should be noted that the correction value $\sigma$ may be calculated only for the patch including the fissuring in the applied texture.

The measurement result correction unit 118 performs processing of correcting the width of the fissuring, which is measured from the image, by using the correction value σ calculated by the correction value calculation unit 117, on the patch including the fissuring. That is, the measured value CWx is corrected by CW=CWx/σ, and the actual width CW of the fissuring is calculated. Thereby, accurate information about the width of the fissuring can be acquired.

The information about the calculated actual fissuring width is stored in the auxiliary storage device 104 or the like as necessary. Further, the generated three-dimensional shape model is displayed on the display device 107 as necessary. In a case of storing, the information is stored in association with the three-dimensional shape model. Alternatively, the information is stored in association with the captured image. [Procedure of Image Processing (Image Processing Method)]

Figure 11:
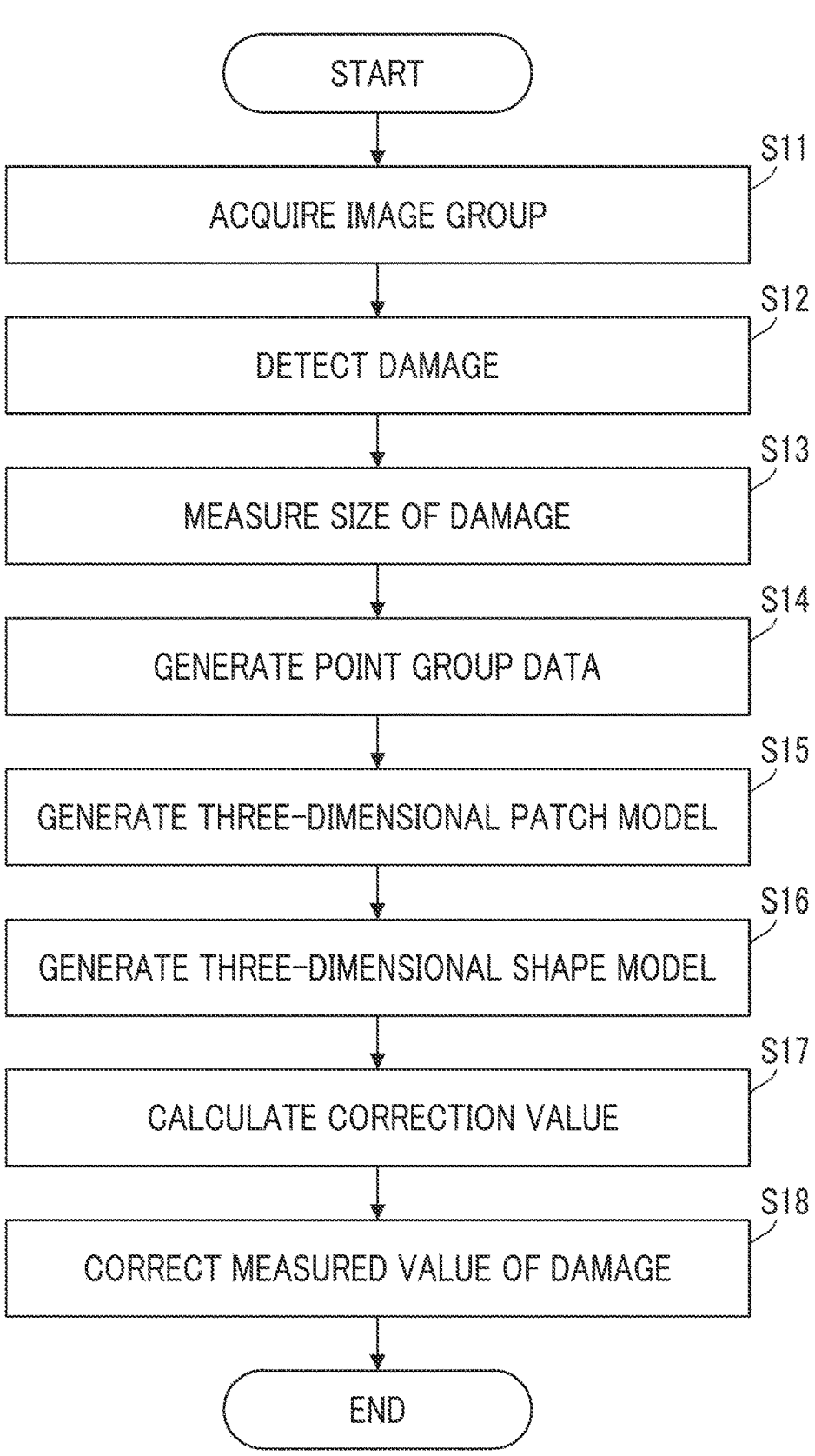
FIG. 11 is a flowchart showing a procedure of image processing performed by the image processing apparatus.

FIG. 11 is a flowchart showing a procedure of image processing by the image processing apparatus.

First, processing of acquiring an image group which is obtained by imaging the subject is performed (step S11). In the present embodiment, the image group obtained by capturing images of the bridge pier is acquired. As described above, imaging is performed by overlapping the imaging ranges from a plurality of viewpoints.

Next, processing of detecting a damage from each acquired image is performed (step S12). In the present embodiment, fissurings are detected. The identification information is applied to the individual fissurings detected from each image, and the fissurings are recorded.

Next, processing of measuring a size of the damage detected in each image is performed (step S13). In the present embodiment, the width of the fissuring is measured. The information about the measured width is recorded in association with the identification information of the fissuring as the measurement target.

Next, processing of generating the three-dimensional point group data of the subject from the acquired image group is performed (step S14). As described above, the processing is performed through the SfM and the MVS. Through the SfM and the MVS, it is possible to acquire information about the position and posture of the camera in a case of capturing each image, in addition to the three-dimensional point group data of the subject.

Next, processing of generating the three-dimensional patch model of the subject is performed on the basis of the generated three-dimensional point group data of the subject (step S15). In the present embodiment, the TIN model is generated using the three-dimensional Delaunay triangulation as the three-dimensional patch model (refer to FIG. 7).

Next, texture mapping is performed on the generated three-dimensional patch model, and processing of generating the three-dimensional shape model of the subject is performed (step S16). As described above, in the processing, the image of the region corresponding to the patch is extracted as the texture from the image corresponding to each patch of the three-dimensional patch model. Then, the extracted texture is applied to the patch, and the three-dimensional shape model is generated (refer to FIG. 8).

Next, processing of calculating the correction value σ is performed (step S17). The processing is performed on at least the patch including the damage. As described above, the correction value σ is calculated from the angle of tilt θ in a case where the image corresponding to the patch is captured. The angle θ is obtained by the angle formed between the camera vector a and the normal vector b. The correction value σ is obtained from the cosine value cos θ at the angle θ. Consequently, the correction value is obtained by σ=cos θ=a·b/|a||b|.

Next, processing of correcting the measured value of the damage with the correction value is performed on the patch including the damage (step S18). That is, the actual size of the damage is calculated by dividing the measured value of the damage by the correction value σ. In the present embodiment, the actual width CW is calculated by dividing the measured value of the width CWx of the fissuring by the correction value σ. That is, the actual width CW is calculated by CW=CWx/σ. The correction is performed on all the patches including the damage. Thereby, an accurate width of the fissuring can be obtained.

As described above, according to the image processing apparatus 100 according to the present embodiment, the effect of the tilt can be eliminated, and the size of the damage can be accurately measured. Further, since it is not necessary to measure the angle of tilt in a case of imaging, it is also possible to smoothly perform work such as imaging at the site.

In the present embodiment, the three-dimensional shape model is generated. However, in a case where the purpose is only to measure the size of the damage, it is not always necessary to generate the three-dimensional shape model. At the very least, it is sufficient if the image corresponding to each patch can be specified.

Second Embodiment

As described above, the three-dimensional shape model is generated by interpolating each patch of the three-dimensional patch model with the texture. The texture applied to each patch is generated by extracting the texture from the image corresponding to each patch. In some cases, the image may be a plurality of images. That is, the imaging is performed by overlapping the imaging ranges from the plurality of viewpoints. Thus, the image corresponding to one patch may be a plurality of images. In a case where there are a plurality of corresponding images, a problem arises as to which image should be selected. The image processing apparatus according to the present embodiment selects an image from the following viewpoints. That is, the image most appropriate for the measurement of the damage is selected as the image corresponding to the patch.

Figure 12:
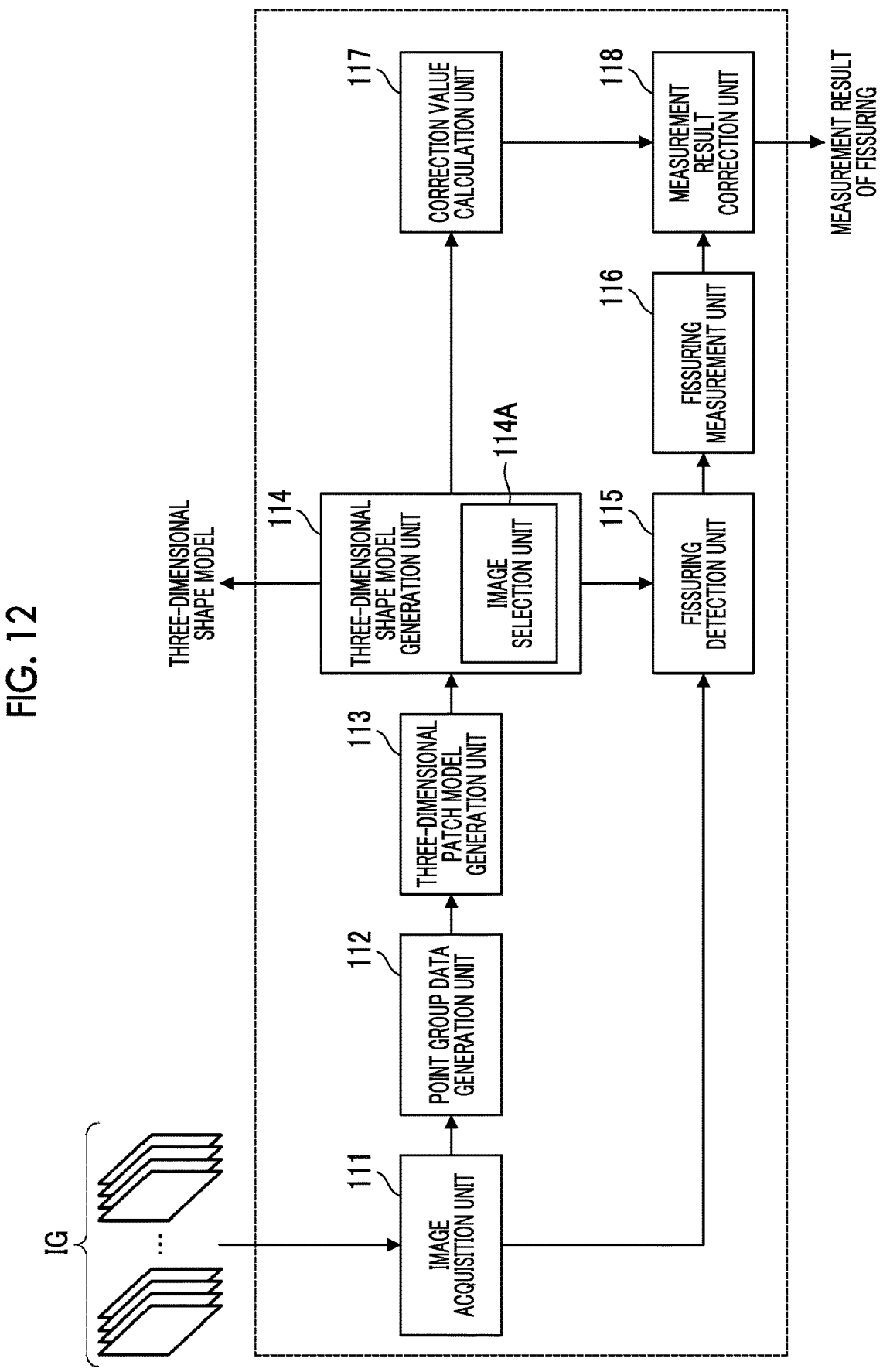
FIG. 12 is a block diagram of main functions of the image processing apparatus.

FIG. 12 is a block diagram of main functions of the image processing apparatus according to the present embodiment.

As shown in the drawing, the image processing apparatus is different from the image processing apparatus 100 of the first embodiment in that the three-dimensional shape model generation unit 114 has a function of an image selection unit 114A. Hereinafter, the function of the image selection unit 114A will be described.

In a case where there are a plurality of images corresponding to the respective patches, the image selection unit 114A performs processing of selecting one image from the plurality of images. The selection is performed from the viewpoint of measurement, and the image most appropriate for the measurement of the damage is selected as the image corresponding to the patch. In the present embodiment, the image in which the angle θ formed between the camera vector a and the normal vector b is the smallest is selected. That is, an image having a smaller angle of tilt is selected. Accordingly, the effect of the tilt can be reduced, the damage can be measured with higher accuracy, and the measured value can be corrected with higher accuracy.

Figure 13:
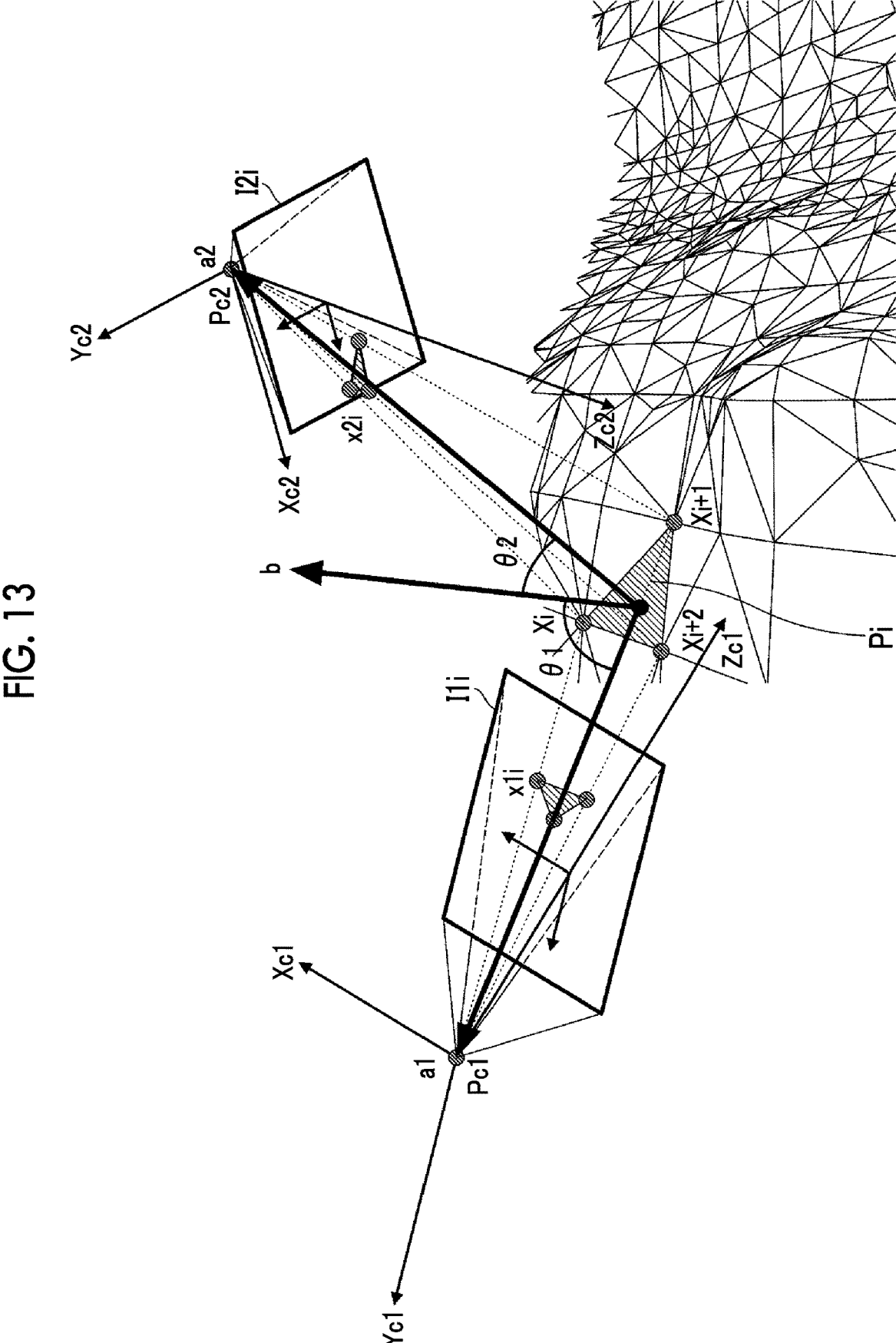
FIG. 13 is a conceptual diagram of selection of an image.

FIG. 13 is a conceptual diagram of image selection.

The drawing shows an example in a case where there are two images corresponding to the patch Pi indicated by hatching. One image is referred to as a first image I1$i$, and the other image is referred to as a second image I2$i$.

The position of the camera in a case where the first image I1$i$ is captured is referred to as a first position Pc1, and the camera vector of the first image I1$i$ is referred to as a first camera vector a1. Further, the position of the camera in a case where the second image I2$i$ is captured is referred to as a second position Pc2, and the camera vector of the second image I2$i$ is referred to as a second camera vector a2.

The first camera vector a1 is defined as a vector connecting the first position Pc1 and the centroid or the center of the patch Pi. Further, the second camera vector a2 is defined as a vector connecting the second position Pc2 and the centroid or the center of the patch Pi.

An image in which the angle formed between the camera vector and the normal vector is smaller is selected. For example, in a case where an angle formed between the first camera vector a1 and the normal vector b is θ1, an angle formed between the second camera vector a2 and the normal vector b is θ2, and θ1>θ2, the second image I2$i$ is selected as the image corresponding to the patch Pi.

In a case where θ1>θ2 (0≤θ1≤90°, 0≤θ2≤90°), cos θ1<cos θ2. Therefore, the image selection unit 114A obtains the cosine value (cos θ) of the angle formed between the camera vector and the normal vector, and selects the image having the largest value as the image corresponding to the patch.

Figure 14:
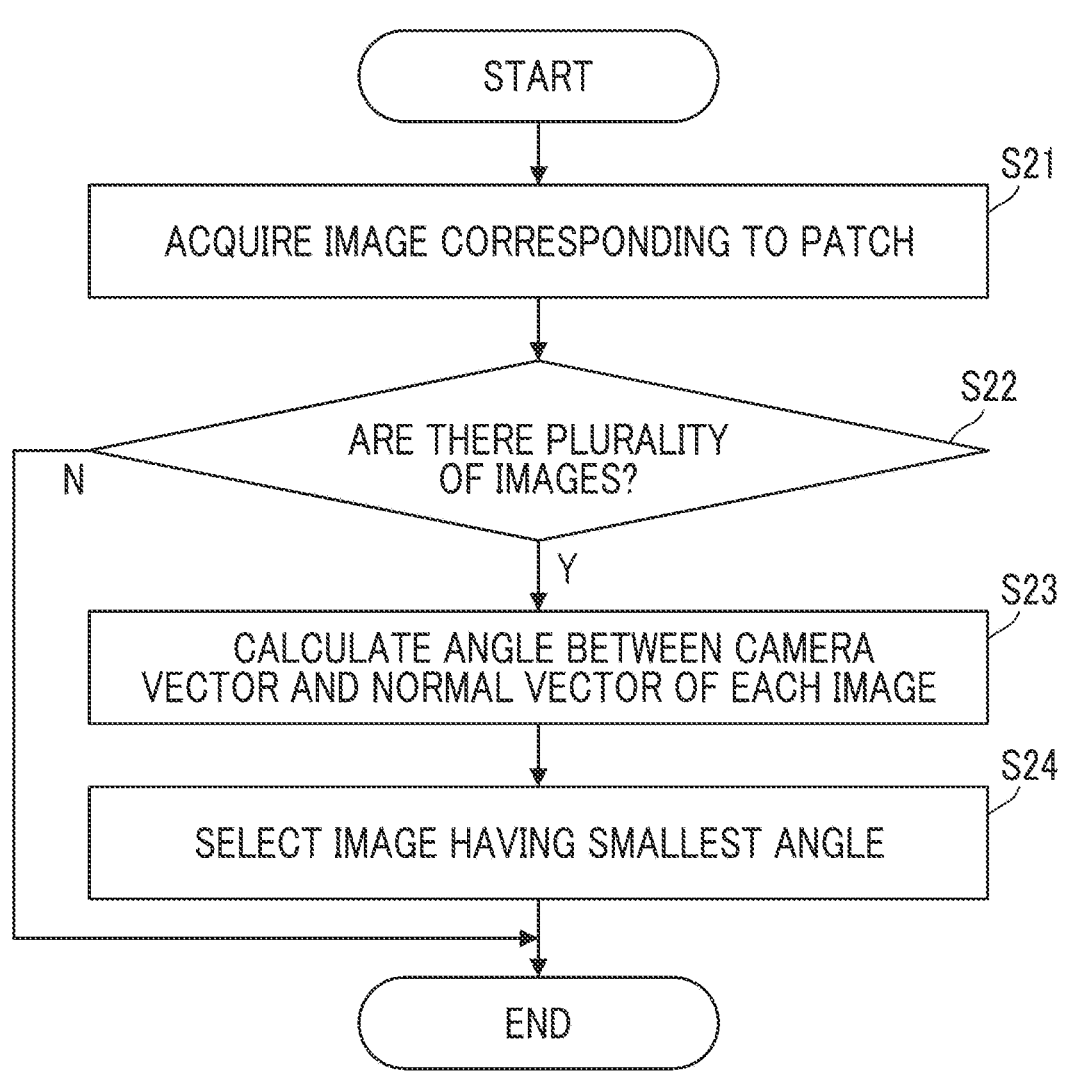
FIG. 14 is a flowchart showing a procedure of processing of selecting the image in an image selection unit.

FIG. 14 is a flowchart showing a procedure of processing of selecting the image in the image selection unit.

First, processing of acquiring the image corresponding to the patch is performed (step S21). Next, processing of determining whether or not there are a plurality of acquired images is performed (step S22). In a case where there are not a plurality of images corresponding to the patch, the selection processing ends. In contrast, in a case where there are a plurality of images corresponding to the patch, processing of selecting an image is performed. First, processing of calculating the angle formed between the camera vector and the normal vector of each image is performed (step S23). The processing is performed by obtaining the cosine value (cos θ) of the angle formed between the camera vector and the normal vector. Next, processing of selecting an image having the smallest angle formed between the camera vector and the normal vector on the basis of the calculation result is performed (step S24). The selected image is set as the image corresponding to the patch.

As described above, the image selected through the processing is the image having the smallest angle of tilt. Accordingly, the effect of the tilt can be reduced, the size of the damage can be measured with higher accuracy, and the measured value can be corrected with high accuracy.

The selected image is used for extraction of the texture. Further, in a case where the image extracted as the texture includes the fissuring, the image is set as a target of the measurement and is also set as a target of correction of the measured value.

Modification Examples

In the above-mentioned embodiments, the case where the image corresponding to the patch is selected on the basis of the angle formed between the camera vector and the normal vector has been described as an example. However, the method of selecting the image corresponding to the patch is not limited thereto. Hereinafter, another example of the method of selecting the image corresponding to the patch will be described.

(1) Method of Selecting on the Basis of Imaging Resolution

In a case where there are a plurality of images corresponding to the patch, an image having a highest imaging resolution is selected as the image corresponding to the patch.

The imaging resolution is synonymous with resolving power. Consequently, for the same subject, an image having a higher resolving power is selected as the image corresponding to the patch. For example, in the case of fissuring, an image which is obtained by imaging the fissuring with a higher resolving power is selected as the image corresponding to the patch. In a case where the same camera performs imaging of the same subject, the resolving power of the image captured at a position closer to the subject is higher. That is, an image having a shorter imaging distance has a higher resolving power. Consequently, in such a case, the image of which the imaging distance is closest, that is, the image of which the camera position with respect to the patch is closest, is selected as the image corresponding to the patch.

(2) Method of Selecting on the Basis of Position of Region Corresponding to Patch In a case where there are a plurality of images corresponding to the patch, the image in which the position of the region corresponding to the patch is closest to the center of the image is selected as the image corresponding to the patch.

In general, in a camera lens, various aberrations increase as a distance from an optical axis (center) increases. Consequently, quality of the captured image deteriorates as the distance from the center thereof increases. Specifically, distortion and the like increase.

Therefore, in a case where there are a plurality of images corresponding to the patch, the image in which the position of the region corresponding to the patch is closest to the center of the image is selected as the image corresponding to the patch. In such a case, for example, for each image, a distance between the centroid or the center of the region corresponding to the patch and the center of the image is calculated, and the image having the smallest calculated distance is selected as the image corresponding to the patch.

Thereby, the size of the damage can be measured on the basis of the high-definition image. As a result, the size of the damage can be measured with higher accuracy.

(3) Other Methods

It is also possible to adopt a configuration in which an image is selected through a plurality of combinations of the above-mentioned methods.

For example, a method of setting a priority rank for each selection method can be adopted. In such a case, in a case where it is difficult to perform selection through the higher-rank selection method, the lower-rank selection method is performed. For example, a method based on the angle formed between the camera vector and the normal vector is referred to as a first selection method, a method of selecting on the basis of the imaging resolution is referred to as a second selection method, and a method of selecting on the basis of the position of the region corresponding to the patch is referred to as a third selection method. In such a case, first, the image is selected through the first selection method, that is, the method based on the angle formed between the camera vector and the normal vector. In a case where it is difficult to select the image through the first selection method, the second selection method is performed. The case where it is difficult to select the image through the first selection method is, for example, a case where there are a plurality of images having the same angle. In such a case, an image is selected from the images having the same angle by the second selection method.

Further, the result of each selection method can be comprehensively determined and selected as the image corresponding to the patch. For example, the results of the respective selection methods are ranked, and a predetermined score is given to each ranking. Then, the total of the scores is calculated, and the image having the highest total score is selected as the image corresponding to the patch. In such a case, a difference may be provided in the score applied to the result of each selection method. That is, weighting may be performed.

Other Embodiment and Modification Example

[About Three-Dimensional Patch Model]

The above-mentioned embodiments have described, as an example, the case where each patch generates a model composed of triangles (triangular mesh) as the three-dimensional patch model. However, the shape of each patch constituting the three-dimensional patch model is not limited thereto. For example, it is also possible to generate a model in which each patch is composed of quadrangulars (quadrangular mesh).

[About Imaging Method]

The image as the processing target may be captured by overlapping the imaging ranges from a plurality of viewpoints, and the imaging method thereof is not particularly limited. It is also possible to mount a camera on an unmanned aerial vehicle such as a drone to perform imaging.

Further, the image as the processing target includes an image extracted from a motion picture. That is, a subject can be imaged as the motion picture, and an image of each frame of the captured motion picture can be used as the image which is the processing target.

[About Measurement Target]

The above-mentioned embodiments have described, as an example, the case where the width of the fissuring appearing on the surface of the bridge pier is measured, but the application of the present invention is not limited thereto. The present invention can be applied in a case where the size of damage appearing on the surface of the structure, particularly a structure made of concrete, is measured from an image. The structure includes not only a bridge but also a tunnel, a dam, a building, and the like. Further, the structure also includes a road.

Further, the above-mentioned embodiments have described, as an example, the case of measuring the width of the fissuring. However, the present invention can also be applied to the case of measuring other damages. In particular, the present invention works effectively in a case where the measurement is affected by the tilt. Consequently, as long as the measurement is affected by the tilt, the present invention can also be applied to a case of measuring the size (area, or the like) of damage such as peeling, exposure of reinforcing bars, water leakage (including rust juice), free lime, and corrosion.

Further, the present invention can also be applied to a case where the length of the fissuring is affected by the tilt and to a case where the length is measured.

[About Measurement of Length of Fissuring]

As described above, the present invention can be applied to the fissuring even in a case where the length is measured.

Further, in the case of measuring the length of the fissuring, the length of the fissuring can be measured through the following method. Patches, in which the fissuring is continuous, are extracted, lengths of the fissurings obtained in the respective extracted patches are added up, and the length of the continuous fissuring is measured. That is, the length of the fissuring detected across a plurality of patches is measured. In a case where the lengths of the fissurings are corrected, the lengths after the correction are added up, and the length of the continuous fissuring is measured.

Figure 15:
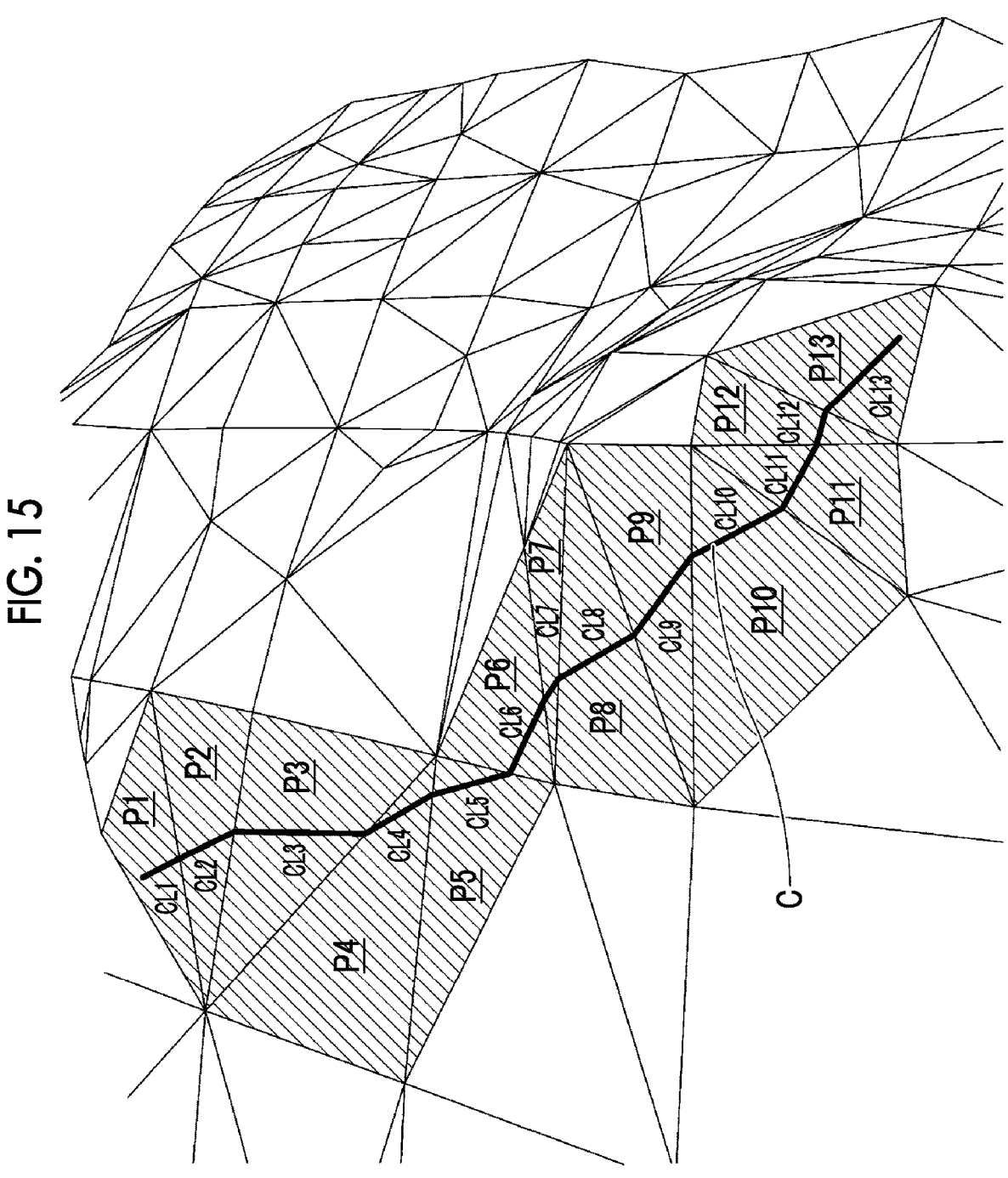
FIG. 15 is a conceptual diagram of a method of measuring a length of the fissuring.

FIG. 15 is a conceptual diagram of the method of measuring the length of the fissuring.

In the drawing, patches P1 to P13 indicated by a broken line are patches including continuous fissuring C. In such a case, the total of the lengths of the fissurings measured in the respective patches P1 to P13 is set as the length of the continuous fissuring C. That is, assuming that the lengths of fissurings in the patches P1, P2, . . . , and P13 are CL1, CL2, . . . , and CL13, the length CL of the continuous fissuring C is calculated by $CL=CL1+CL2+ \ldots +CL13$.

Similarly, in a case of measuring an area of the damage, the areas of the damages measured in the respective patches can be added up to measure the area of the damage detected across a plurality of regions.

[About Configuration of Image Processing Apparatus]

The functions of the image processing apparatus are implemented by various processors. The various processors include: a CPU and/or a graphics processing unit (GPU) as a general-purpose processor which functions as various processing units by executing programs; a programmable logic device (PLD) as a processor capable of changing a circuit configuration after manufacture, such as a field-programmable gate array (FPGA); a dedicated electrical circuit as a processor, which has a circuit configuration specifically designed to execute specific processing, such as an application-specific integrated circuit (ASIC); and the like. Program is synonymous with software.

One processing unit may be composed of one of these various processors, or may be composed of two or more processors of the same type or different types. For example, one processing unit may be composed of a plurality of FPGAs or a combination of a CPU and an FPGA. Further, a plurality of processing units may be composed of one processor. As an example of the plurality of processing units composed of one processor, first, as represented by computers used for a client, a server, and the like, there is a form in which one processor is composed of a combination of one or more CPUs and software and this processor functions as a plurality of processing units. Second, as represented by a system-on-chip (SoC), there is a form in which a processor that realizes the functions of the whole system including a plurality of processing units with a single integrated circuit (IC) chip is used. As described above, the various processing units are configured by using one or more of the various processors as a hardware structure.

[Other]

The method of selecting the image corresponding to the patch described in the second embodiment, together with the modification example, is also effective in a case where the size of the damage is not corrected. That is, an image appropriate for the measurement of the damage can be selected. Thus, the damage can be measured with higher accuracy than usual. A normal case is a case of selecting the image corresponding to the patch without selecting the image from the viewpoint described in the second embodiment. Further, a better image can be applied to each patch in a case where the three-dimensional shape model is generated. Thereby, a higher quality three-dimensional shape model can be generated.

Figure 16:
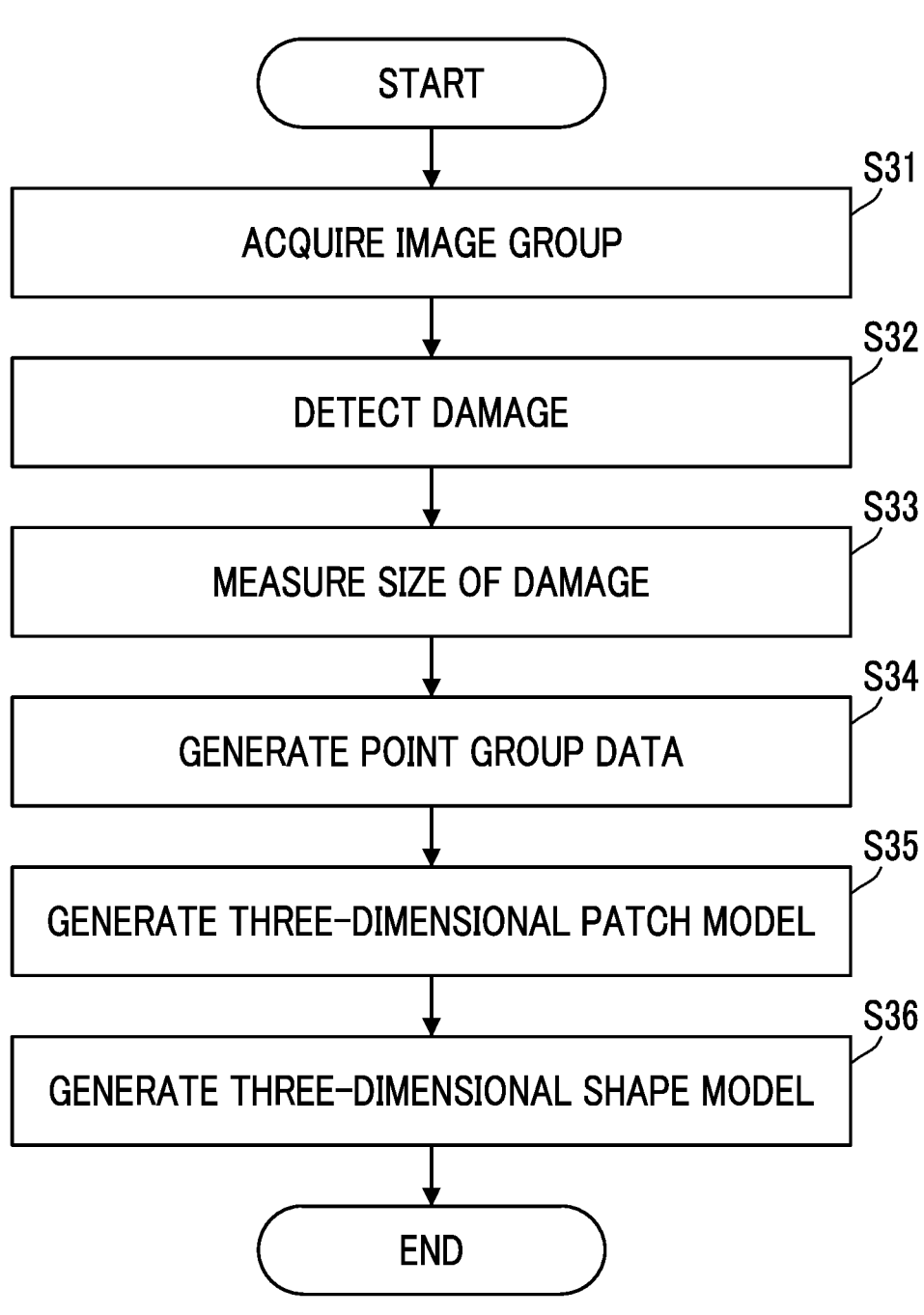
FIG. 16 is a flowchart showing a procedure of the processing in a case where a size of the damage is measured without correction.

FIG. 16 is a flowchart showing a procedure of the processing in a case where the size of the damage is measured without correction.

First, processing of acquiring an image group which is obtained by imaging the subject is performed (step S31). Next, processing of detecting the damage from each acquired image is performed (step S32). For example, processing of detecting the fissuring is performed. Next, processing of measuring the size of the damage detected in each image is performed (step S33). For example, a width of the fissuring is measured. Next, processing of generating three-dimensional point group data of the subject from the acquired image group is performed (step S34). For example, the three-dimensional point group data of the subject is generated through the SfM and the MVS. Next, processing of generating the three-dimensional patch model of the subject is performed on the basis of the generated three-dimensional point group data of the subject (step S35). For example, a TIN model is generated using the three-dimensional Delaunay triangulation. Next, texture mapping is performed on the generated three-dimensional patch model, and processing of generating the three-dimensional shape model of the subject is performed (step S36). At this time, the image is selected through the method described in the second embodiment (including the method of the modification example). That is, the image corresponding to the patch is selected through any one of (a) a method of selecting the image corresponding to the patch on the basis of the angle formed between the camera vector and the normal vector, (b) a method of selecting on the basis of the imaging resolution, or (c) a method of selecting on the basis of the position of the region corresponding to the patch or a method of a combination thereof. Accordingly, an image in which the size of the damage is measured with high accuracy is applied to each patch. In a case where the correction of the present invention is applied, it is possible to perform more accurate measurement.

In addition, in the case of the present example as well, it is preferable to measure the length of the continuous fissuring by adding up the lengths of the fissurings measured in the respective patches.

[Supplementary Notes]

Further, the following supplementary notes of the above-mentioned embodiments will be disclosed.

(Supplementary Note 1)

An image processing apparatus comprising a processor, wherein the processor is configured to execute:

processing of acquiring a plurality of images of a subject captured by a camera with overlapping imaging ranges from a plurality of viewpoints;

processing of detecting damage to a surface of the subject from the acquired plurality of images;

processing of generating three-dimensional point group data of feature points by analyzing the acquired plurality of images;

processing of generating a three-dimensional patch model of the subject on the basis of the generated point group data;

image selection processing of selecting an image corresponding to each patch of the three-dimensional patch model from the acquired plurality of images; and processing of measuring a size of the damage in a region corresponding to the patch in the selected image.

(Supplementary Note 2)

The image processing apparatus according to Supplementary Note 1, wherein the processor selects an image having a smallest angle θ formed between a camera vector a and a normal vector b, in the image selection processing.

(Supplementary Note 3)

The image processing apparatus according to Supplementary Note 1, wherein the processor selects an image having a highest imaging resolution, in the image selection processing.

(Supplementary Note 4)

The image processing apparatus according to Supplementary Note 1, wherein the processor selects an image in which a position of the region corresponding to the patch is closest to a center of the image, in the processing of selecting the image corresponding to the patch.

EXPLANATION OF REFERENCES

1: system that measures width of fissuring
10: camera
100: image processing apparatus
101: CPU
102: RAM
103: ROM
104: auxiliary storage device
105: communication interface
106: input device
107: display device
111: image acquisition unit
112: point group data generation unit
113: three-dimensional patch model generation unit
114: three-dimensional shape model generation unit
114A: image selection unit
115: fissuring detection unit
116: fissuring measurement unit
117: correction value calculation unit
118: measurement result correction unit
a: camera vector
a1: first camera vector
a2: second camera vector
b: normal vector
θ: angle formed between camera vector and normal vector
C: fissuring
CL1 to CL13: length of fissuring
I1$i$: first image
I1$i$: second image
IG: image group
Ii: image
OL: overlap
SL: side lap
Ob: subject (bridge pier)
P: patch
P1 to P13: patch including fissuring
Pc1: first position
Pc2: second position
R: imaging range
S: surface including fissuring
S1 to S6: procedure of processing of SfM
S11 to S18: procedure of image processing
S21 to S24: procedure of processing of selecting image
S31 to S36: procedure of processing in case of measuring size of damage without correction

What is claimed is:

1. An image processing apparatus comprising a processor, wherein the processor is configured to:

acquire a plurality of images of a subject captured by a camera with overlapping imaging ranges from a plurality of viewpoints;

detect damage to a surface of the subject from the acquired plurality of images;

measure a size of the detected damage;

analyze each of the acquired plurality of images to estimate a position and a posture of the camera at which each image has been captured, and to generate three-dimensional point group data of feature points;

generate a three-dimensional patch model of the subject on the basis of the generated point group data;

select an image corresponding to each patch of the three-dimensional patch model from the acquired plurality of images;

extract an image applied to each patch from the selected image corresponding to each patch;

calculate, on the basis of the estimated position and posture of the camera at which the extracted image has been captured, a correction value for correcting a measurement result of the size of the detected damage in the extracted image; and correct the measurement result of the size of the detected damage in the extracted image by the calculated correction value.

2. The image processing apparatus according to claim 1, wherein the processor is configured to calculate the correction value by calculating a cosine value cos θ of an angle θ formed between a camera vector a connecting the estimated position of the camera to the patch, and a normal vector b of the patch.

3. The image processing apparatus according to claim 2, wherein the processor is configured to calculate the cosine value cos θ on the basis of cos $\theta = a \cdot b / |a||b|$.

4. The image processing apparatus according to claim 2, wherein the processor is configured to correct the measurement result of the size of the detected damage by dividing the measurement result of the size of the detected damage by the cosine value cos θ.

5. The image processing apparatus according to claim 2, wherein the processor is configured to select an image having a smallest angle θ between the camera vector a and the normal vector b.

6. The image processing apparatus according to claim 1, wherein the processor is configured to select an image having a highest imaging resolution.

7. The image processing apparatus according to claim 1, wherein the processor is configured to select an image in which a position of the region corresponding to the patch is closest to a center of the image.

8. The image processing apparatus according to claim 1, wherein the processor is configured to:

generate the patch using a triangular mesh or a square mesh; and generate the three-dimensional patch model.

9. The image processing apparatus according to claim 1, wherein the processor is configured to calculate a physical dimension of the patch in the three-dimensional patch model.

10. The image processing apparatus according to claim 9, wherein the processor is configured to calculate the physical dimension of the patch, on the basis of distance measurement information associated with the image.

11. The image processing apparatus according to claim 9, wherein the processor is configured to calculate the physical dimension of the patch, on the basis of information about a reference point included in the image.

12. The image processing apparatus according to claim 1, wherein the damage is fissuring, and either of a width or a length of the fissuring is measured.

13. The image processing apparatus according to claim 12, wherein the processor is configured to:

extract the patch in which the fissuring is continuous;

add up the length of the fissuring which is subjected to the correction and which is obtained in each of the extracted patches; and further measure the length of the continuous fissuring.

14. An image processing method comprising:

acquiring a plurality of images of a subject captured by a camera with overlapping imaging ranges from a plurality of viewpoints;

detecting damage to a surface of the subject from the acquired plurality of images;

measuring a size of the detected damage;

analyzing each of the acquired plurality of images to estimate a position and a posture of the camera at which each image has been captured, and to generate three-dimensional point group data of feature points;

generating a three-dimensional patch model of the subject on the basis of the generated point group data;

selecting an image corresponding to each patch of the three-dimensional patch model from the acquired plurality of images;

extracting an image applied to each patch from the selected image corresponding to each patch;

calculating, on the basis of the estimated position and posture of the camera at which the extracted image has been captured, a correction value for correcting a measurement result of the size of the detected damage in the extracted image; and correcting the measurement result of the size of the detected damage in the extracted image by the calculated correction value.

15. A non-transitory, computer-readable tangible recording medium which records thereon a program for causing, when read by a computer, the computer to execute:

acquiring a plurality of images of a subject captured by a camera with overlapping imaging ranges from a plurality of viewpoints;

detecting damage to a surface of the subject from the acquired plurality of images;

measuring a size of the detected damage;

analyzing each of the acquired plurality of images to estimate a position and a posture of the camera at which each image has been captured, and to generate three-dimensional point group data of feature points;

generating a three-dimensional patch model of the subject on the basis of the generated point group data;

selecting an image corresponding to each patch of the three-dimensional patch model from the acquired plurality of images;

extracting an image applied to each patch from the selected image corresponding to each patch;

calculating, on the basis of the estimated position and posture of the camera at which the extracted image has been captured, a correction value for correcting a measurement result of the size of the detected damage in the extracted image; and correcting the measurement result of the size of the detected damage in the extracted image by the calculated correction value.

* * * * *